United States Patent [19]

Roe

[11] 4,281,461
[45] Aug. 4, 1981

[54] LETTER SCALE

[76] Inventor: Nathaniel R. Roe, 20 S. Howells Point Rd., Bellport, N.Y. 11713

[21] Appl. No.: 154,228

[22] Filed: May 29, 1980

[51] Int. Cl.³ .......................... G01G 1/18; G01B 3/08
[52] U.S. Cl. ...................................... 33/138; 177/245; 177/251; 177/192; 177/126
[58] Field of Search ............... 177/245, 246, 251, 264, 177/127, 126, 250, 192; 33/483, 137, 138, 139, 140

[56] References Cited

U.S. PATENT DOCUMENTS

| 2,040,037 | 5/1936 | Wily | 177/127 |
| 2,805,850 | 9/1957 | Robinson | 177/126 |
| 2,942,348 | 6/1960 | Caruso | 33/138 X |
| 3,334,698 | 8/1967 | Von Ronn | 177/251 X |
| 3,365,011 | 1/1968 | Heil | 177/251 X |

FOREIGN PATENT DOCUMENTS 16192 of 1888 United Kingdom ..................... 177/251
7201 of 1893 United Kingdom ..................... 177/251

Primary Examiner—Harry N. Haroian
Attorney, Agent, or Firm—Harold L. Stults; Pasquale A. Razzano

[57] ABSTRACT

A combination rule and scale is disclosed in which the weight of the rule is used to counterbalance the weight of an object, such as a letter, and provide a measurement of the object's weight. In one embodiment the combination rule and scale comprises a coilable tape rule having both linear and weight gradations thereon. The rule's case is adapted to be supported in a suspended condition in alignment with its center of gravity and includes a clamp device for supporting an object to be weighed on the casing. By extending the tape rule on the side of the tape opposite the support device, the casing can be balanced and the weight of the object determined.

8 Claims, 5 Drawing Figures

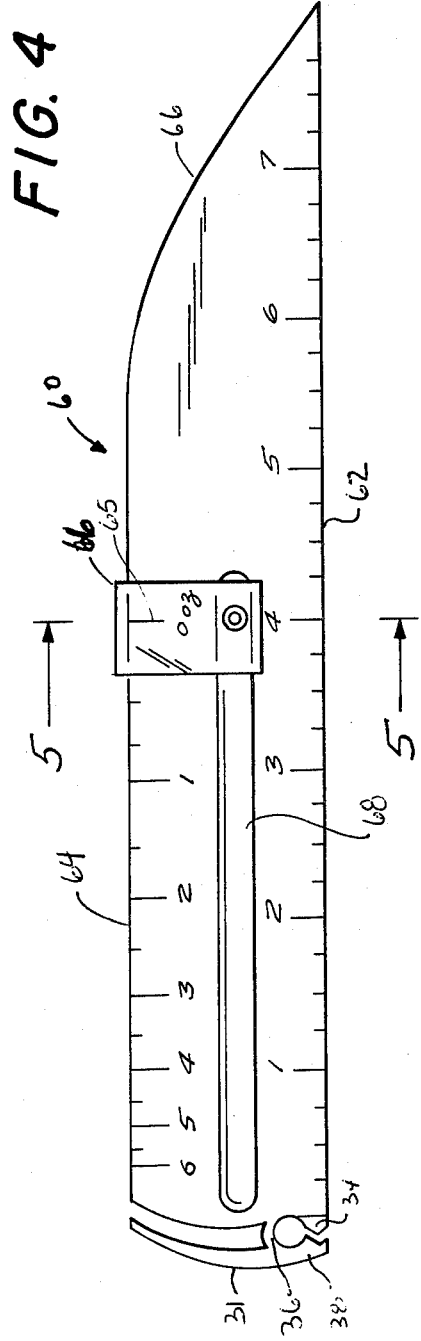
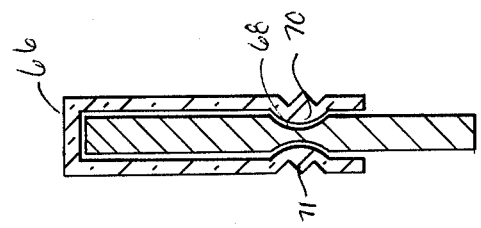
FIG. 4
FIG. 5

LETTER SCALE

The present invention relates to measuring rules and, in particular, to a measuring rule which is also adapted to be used as a weight scale.

Measuring rules, including rulers and tape measures using coilable rules have been provided in the past in many different forms of construction. However, such rules have only been used for the purpose of linear measurement. The rule of the present invention, on the other hand, is adapted not only for linear measurement, but also for use as a scale for weighing objects. This is achieved by the use of the measuring rule itself as a balancing element for an object. Thus, the measuring rule has a dual use making it functionally far more valuable, at little additional manufacturing cost.

An object of the present invention is to provide a dual purpose measuring rule.

Another object of the present invention is to provide a measuring rule which can be used for both linear measure and for weight measures.

Another object of the present invention is to provide a tape measure which is of generally conventional construction, but which can function both as a scale and as a linear measurement tool.

A further object of the present invention is to provide a dual purpose scale which is relatively simple and inexpensive to manufacture and durable in use.

In accordance with one aspect of the present invention, a combination tape measure and scale is provided which consists of a case containing a spring-biased coiled tape measure therein. The case has means on it for supporting the case in a suspended condition in alignment with its center of gravity, so that the case can be held in a balanced condition. The opposed side edges of the case, respectively, have a device for supporting an object to be weighed and an opening for the tape rule. The weight of the tape rule, as it is extended, is used to balance the weight of the object to be measured about the center of gravity of the casing. When the casing is balanced by extension of the tape rule, gradations on the rule provide an indication of the weight of the object supported.

In another embodiment of the invention a straight edge or ruler is provided with an object supporting clip on one end thereof and is used as a balance to weigh the object.

The above, and other features, objects and advantages of this invention will be apparent in the following detailed description of an illustrative embodiment thereof, which is to be read in connection with the accompanying drawings, wherein:

FIG. 4 is a plan view of another embodiment of the present invention; and

FIG. 5 is a sectional view taken along line 5—5 of FIG. 4.

Figure 1:
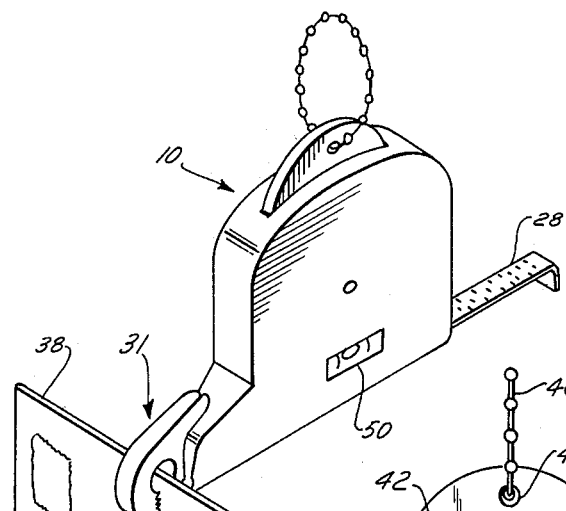
FIG. 1 is a perspective view of a combination tape measure and rule constructed in accordance with the present invention.
Figure 2:
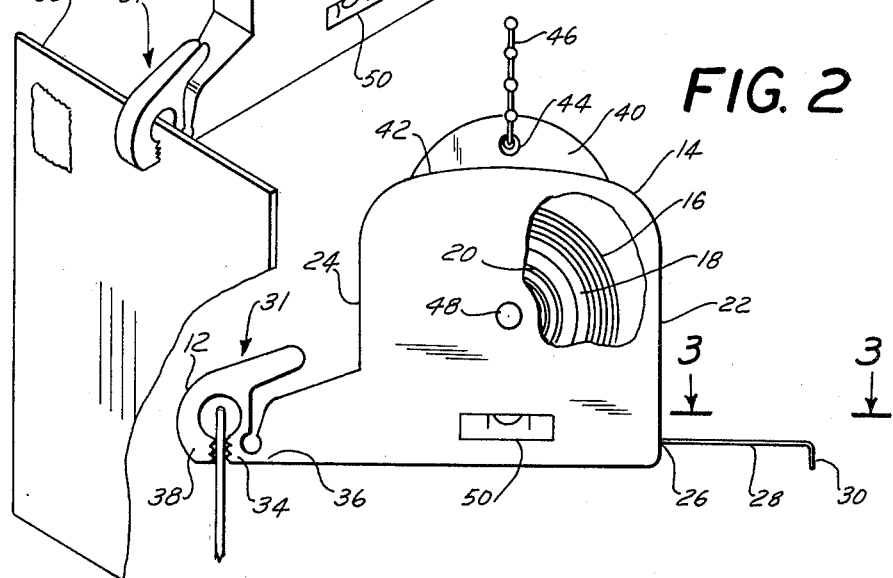
FIG. 2 is a side view, partly in section, showing the tape measure of FIG. 1 in use.

Referring now to the drawing in detail, and initially to FIGS. 1 and 2 thereof, a tape measure casing 10, constructed in accordance with the present invention is shown supporting an object 12 whose weight is to be measured. The tape measure is essentially of conventional construction and includes a casing 14 formed of lightweight, but relatively hard, plastic material, containing a coiled tape rule 16. The tape rule is secured at its inner end to a hub 18 which is, in turn, biased to retract the tape by a spring 20, in the conventional manner.

Casing 14 has a pair of opposed side edges 22, 24, with an opening 26 formed in side edge 22. Tape rule 16 has a free end 28, which extends through the opening 24 to a stop tab 30. The tape can be retracted or withdrawn into the casing in the conventional manner by actuation of a conventional brake release mechanism such as is used on tape measures manufactured by Roe International Inc. of Patchogue, N.Y. Preferably, the rule has a longitudinal bend formed therein, so that it remains straight in its extended position as a result of the tension placed in the rule by the bend. This is a known and conventional construction for tape rules.

In accordance with a feature of the present invention, the opposite side 24 of casing 14 is provided with a support member 31 integrally formed with the casing. This support member consists of a clamp having a pair of jaws 32, 34, which are normally biased toward each other by the resilient nature of the material from which they are formed. This resilience is further aided by the living hinge 36 formed between clamp 31 and the remainder of the casing. This living hinge is simply a narrowed section of the plastic casing. The clamp enables an object such as a letter 38 to be supported on the casing.

To enable the tape measure to operate as a scale, the casing is provided with a flange element 40 along its upper side 42. This flange has an opening 44 formed therein through which a key chain 46 or other flexible support member can be inserted. Opening 44 is located approximately in alignment with the central axis of the casing and, in particular, with the central axle 48 of the hub 18. This is essentially the location of the center of gravity of the casing. By this construction, when the casing is suspended from key chain 48, the casing can act as a balance for the object 38 to be weighed and the weight of the extended rule 28. To indicate this balance, a bubble level 50 can be provided in the casing in any convenient manner.

Figure 3:
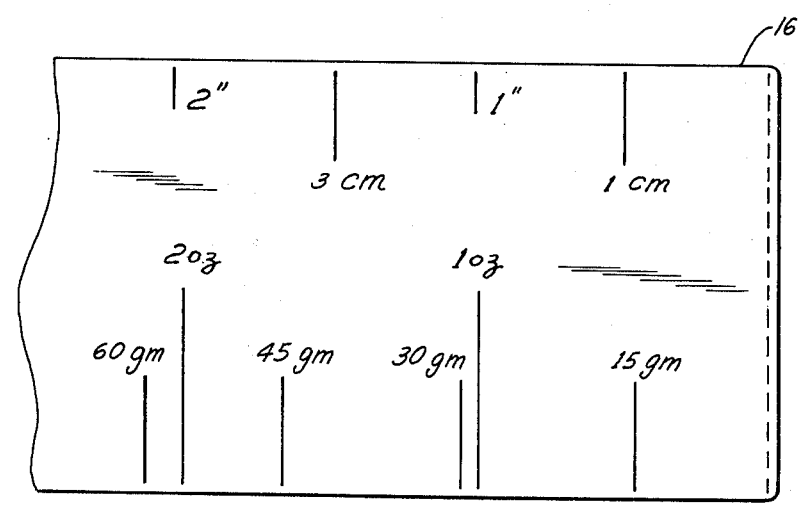
FIG. 3 is a plan view taken along line 3—3 of FIG. 2, showing the gradation markings on the tape rule.

To provide a visual indication of the weight being measured, tape 16 is imprinted with indicia representative of the weight. For example, as shown in FIG. 3, one edge of tape 16 is marked with indicia representative of linear measurements, for example, in both inches and centimeters, while the other edge of the tape is marked with indicia representative of weight such as, for example, ounces and grams. The location of the indicia and the spacing therebetween is selected according to the weight, i.e. the specific gravity of the tape so that when the gradations align with edge 22 of casing 14, they will balance an equivalent weight supported in clamp 31. For example, as shown in FIG. 3, when the gradation for 3 ounces aligns with the edge of the casing, it will balance a 3-ounce letter supported in the clamp 31.

Accordingly, it is seen that a relatively simply constructed tape measure, which is essentially of conventional construction, has been adapted for use as a scale to balance objects to measure the weight of objects such as letters and the like. The tape rule itself is used as the balancing weight, and the casing is provided additionally with a clamp means for supporting the letter or other object to be weighed. Thus the tape measure has been adapted to an additional function beyond mere linear measurement.

Another embodiment of the invention is illustrated in FIGS. 4 and 5 of the drawing. In this embodiment, a straight edge 60 is provided as a measuring rule. The straight edge has one longitudinally extending edge 62 along which linear measurement indicia are marked or formed. The other edge 64 of the tape rule is marked with weight indicia, to provide a weight scale for measuring an object such as a letter or the like. The edge 64 may be tapered along one end 66 thereof to form a letter opener or the like.

A clamp 31 is formed on one end of the straight edge 60. This clamp is identical to the clamp previously described, and is formed of a resilient plastic material connected to the tape rule by a living hinge 36. The clamp can be operated, by engaging the lever 35 thereof to spread the jaws 38, 34 in order to enable the jaws to grasp a letter or the like therein.

A clear plastic slide 66 is mounted on the tape rule 60 for longitudinal movement with respect to the rule. As seen in FIG. 5, the rule has a pair of longitudinally extending recesses 68 formed on opposite sides thereof in which pertuberances 70 on the U-shaped slide clip 66 are formed. The clip also has a pair of outwardly extending cone shaped pins 71, by which the slide may be grasped between the user's fingers.

When a letter or other object is inserted in the clamp 31, the slide 66 is engaged between the user's fingers on the cones 71, to provide a balance point. The slide is moved longitudinally with respect to the rule until the weight of the letter and the weight of the rule balances. The indicia 64 marked on the rule are located so as to provide a measurement, when aligned with the zero mark 65 of the slide, as seen in FIG. 4, of the weight of the object in the clamp. The spacing between the indicia are of varying lengths, because the weight measurement in this case is a function of the weight of the rule and the length of the rule extending beyond the slide. As a result of the moments produced, the balancing force is based on the square of the distance of the weight from the slide, so that the distance between the measuring indicia varies along the length of the rule.

Accordingly, a simplified measuring rule and scale is provided by this embodiment of the invention, which enables the user to not only weigh letters, but to use the straight edge as a conventional linear measuring device.

Although an illustrative embodiment of the invention has been described herein with reference to the accompanying drawings, it is to be understood that the invention is not limited to that precise embodiment, and that various changes and modifications may be effected therein by one skilled in the art without departing from the scope or spirit of this invention.

What is claimed is:

1. A combination tape measure and letter scale comprising a case, a coilable tape rule wound in said case and extending from one side thereof, said rule having both linear and weight gradations thereon, said case having means for supporting said case in a suspended condition in alignment with its center of gravity, and means on the side thereof opposite the side through which said rule extends for supporting an object to be weighed on the casing.

2. The combination tape measure and letter scale as defined in claim 1, wherein said supporting means comprises a resilient clamp.

3. The combination tape measure and scale as defined in claim 2, wherein said clamp is integrally formed with said case.

4. A combination tape measure and scale comprising a casing, a spring biased coiled tape measure mounted in said casing, said casing having means for supporting it in a suspended condition in alignment with its center of gravity, and opposed side edges, one of which has an opening therein through which said rule may be extended, and the other of which includes means for supporting an object to be weighed on the casing, said rule having linear gradations, and weight gradations spaced thereon according to the specific gravity of the tape rule material such that when the casing is suspended on said case supporting means, extension of the tape rule will counterbalance the weight of an object on said object supporting means and, when said casing is in balance, provide an indication of the weight of said object by alignment of a weight indicia with said one side edge of the casing.

5. A combination tape measure and scale as defined in claim 4, wherein said object support means comprises a resilient clamp.

6. A combination tape measure and scale as defined in claim 5, wherein said clamp is integrally formed with said case.

7. A combination tape measure and scale as defined in claim 6, wherein said case support means comprises an aperture formed in a portion of the case in alignment with the center of gravity of the case and rule.

8. A combination tape measure and scale as defined in claim 1 including means for indicating the level and balance of the casing.

* * * * *